3 Sheets—Sheet 1.

J. T. FIFE.
Bee-Hive.

No. 206,714. Patented Aug. 6, 1878

Attest:
Geo. T. Smallwood Jr.
Alex. H. Galt

Inventor:
James T. Fife
By [signature]
Atty's

J. T. FIFE.
Bee-Hive.

No. 206,714.  Patented Aug. 6, 1878.

Attest:
Geo. T. Smallwood Jr.
Alex. H. Galt

Inventor:
James T. Fife
By Knight
Attys

3 Sheets—Sheet 3.
J. T. FIFE.
Bee-Hive.
No. 206,714.      Patented Aug. 6, 1878.
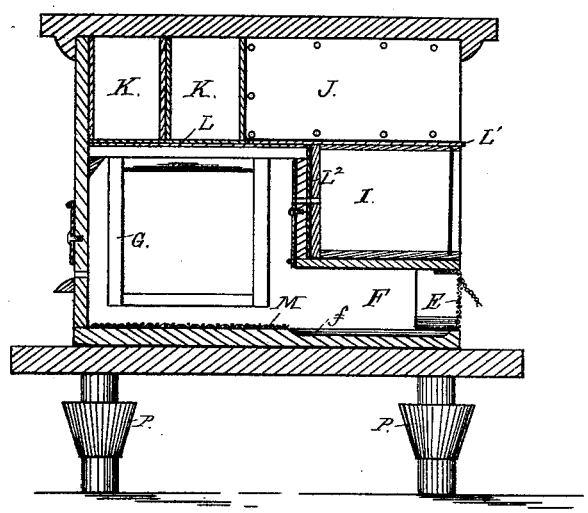
WITNESSES
Geo. T. Smallwood Jr.
A. H. Galt.
INVENTOR
James T. Fife
By Knight Bros Attorneys

UNITED STATES PATENT OFFICE.

JAMES T. FIFE, OF CORNING, IOWA.

IMPROVEMENT IN BEE-HIVES.

Specification forming part of Letters Patent No. 206,714, dated August 6, 1878; application filed March 7, 1878.

*To all whom it may concern:*

Be it known that I, JAMES T. FIFE, of Corning, in the county of Adams and State of Iowa, have invented a certain new and Improved Bee-Hive, of which the following is a specification:

My improved hive is constructed with revolving shutters at front and back, adapted to be turned in either direction, so as to open the entrances wide, partially close them to exclude drones or prevent the entrance of more than one bee at a time, or to completely close the entrances. It is provided in front with a feeding and air chamber, (with troughs for the feed,) protected by a gauze shutter which is adjustable to facilitate the introduction of the food and the admittance of the bees thereto. It is reversible, so as to exclude the bees from the chamber when desired. The brood-chamber has a movable gauze bottom, and the entire hive rests on a table furnished with feet protected by circular troughs to exclude drones, said table having, in its upper surface, holes or cavities for the reception of the feet of the hive proper, so that the hive proper may rest close down on the table or may be elevated for ventilation, as required. The bottoms and ends of the honey-boxes are formed of honey-boards of paper or pasteboard for the purpose of absorbing moisture.

Figure 1:
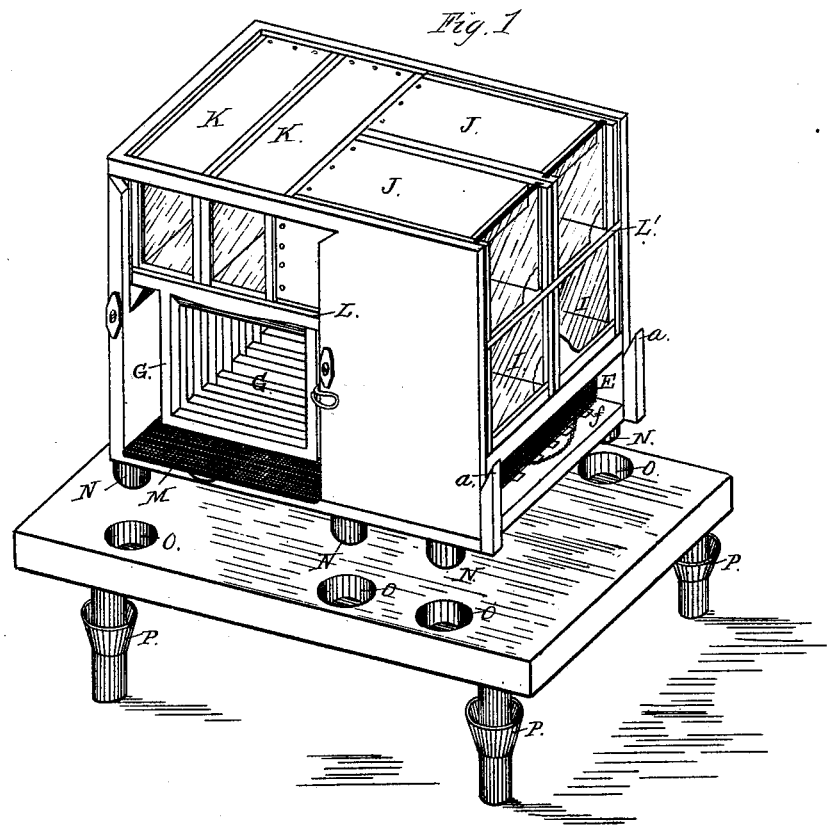
Figure 2:
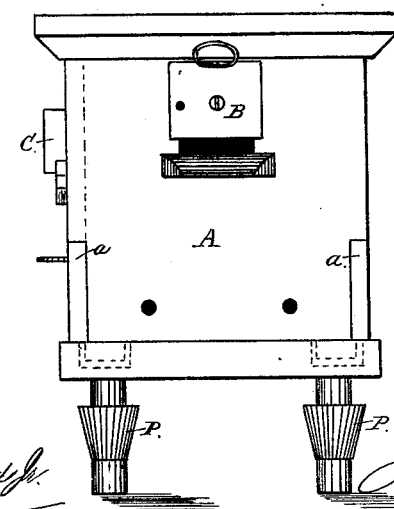
Figure 3:
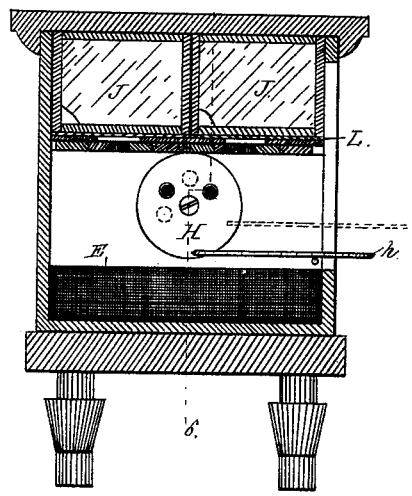
Figure 4:
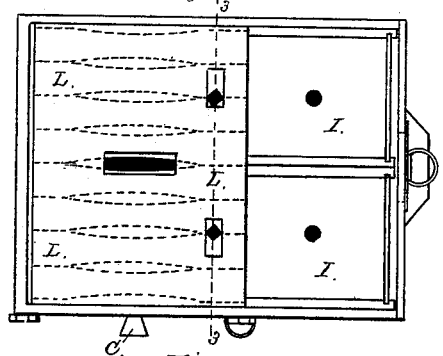
Figure 5:
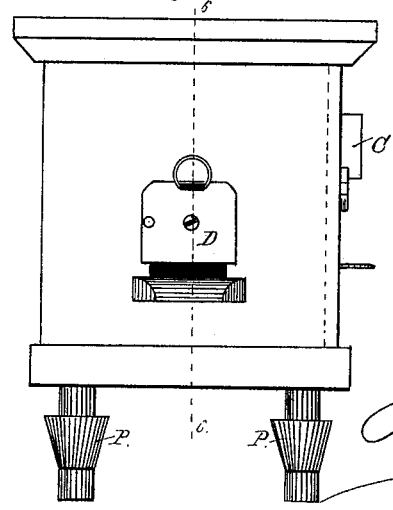

In the accompanying drawing, Figure 1 is a perspective view of the interior portion of my improved hive with the top and shutters removed, and showing it elevated from its table. Fig. 2 is a front end view. Fig. 3 is a transverse section on line 3 3, Fig. 4. Fig. 4 is a plan with the upper tier of honey-boxes removed. Fig. 5 is a rear end view. Fig. 6 is a longitudinal section on the line 6 6.

A represents the removable front door of the hive, which rests in lugs or cleats $a$ to confine it in position. It is provided in its upper part with a bee-entrance, protected by an eccentrically-pivoted revolving shutter, B, which, when placed in horizontal position, with the handle up, leaves the entrance completely open, or, when set in an intermediate position, reduces the size of the entrance, so as to exclude drones and, if desired, admit but a single bee at a time, or when thrown horizontally, with the handle down, completely closes the entrance.

C is the removable door, giving the bee-keeper access to the brood-chamber or bee-home.

D is a revolving shutter at the rear end of the hive, similar in construction and operation to the shutter B in front. This gives the bees direct access to the bee-home.

E is a slide constructed of wire-gauze, set on a suitable frame, employed to guard the feed-chamber F while admitting air as required. The bottom of the feed-chamber is constructed with a number of troughs, $f$, in which the food is placed while the sliding gauze shutter E is shoved back. The shutter is then drawn forward to admit the bees to the feed. If desired, the gauze shutter may be reversed in position, so as to entirely exclude the bees from the feed and air chamber.

G G are the customary comb-frames in the brood-chamber or bee-home.

H is a revolving perforated shutter, having two or more holes, which may be placed in register with similar holes in the wall of the brood-chamber, thereby admitting the bees to the lower honey-boxes, I. The shutter H is pivoted in its center, and is operated by a rod, $h$, to open and close the holes, as required.

J J are honey-boxes longer than I I, extending over a portion of the brood-chamber, and thus over the bee-home to a short distance, so as to make them easy of access. K K are transverse honey-boxes surmounting the bee-home. The arrangement of the honey-boxes affords large capacity for storing new honey, and permits the bees to enter either set of boxes J J and K K at will, and likewise provides a third set, I I, which are closed, when desired, by the shutter H. All these honey-boxes are provided at bottom and at one or more ends with honey-boards L $L^1$ $L^2$ of pasteboard, which may be perforated, as required, to admit the bees, or may be used as shutters to exclude the bees from the boxes. The pasteboard honey-board L forms the top of the brood-chamber, and has suitable apertures to admit the bees to the honey-boxes J and K. The boards $L^1$ form the bottoms for the boxes J, and may be used to shut the bees out of the said boxes when required. The boards L² form the backs of the boxes I, and are provided with apertures corresponding with those in the wall of the brood-chamber, which are closed by the revolving shutter H. The bottom of the brood-chamber is formed of a sliding floor, M, of wire-gauze, affording full and free ventilation when the hive is raised from the table O. For this purpose I provide the hive proper with six (more or less) small feet, N, to rest on the hive-table O when ventilation is required, or to fit down in suitable cavities o in the hive-table when so great a circulation of air is not desired.

When the ordinary board floor is used in place of the gauze floor M, I apply two three-inch pieces, nailed underneath the hive and extending its entire length on each side, for the board to slide on. The said pieces have openings to receive pegs or supports projecting upward from the table, instead of the feet on the hive inserted in the holes o o in the table.

P P are circular cups surrounding the feet of the hive-table, to be filled with coal-tar, concentrated lye, or any other material which will prevent insects or vermin climbing from the ground to the hive.

Having thus described my invention, the following is what I claim as new and desire to secure by Letters Patent:

1. The combination of the brood-chamber G, the honey-boxes I I, arranged at the side of said brood-chamber, and the upper honey-boxes, J J, surrounding the boxes I I and extending over a portion of the brood-chamber, as shown and described.

2. The rectangular revolving doors B and D, pivoted eccentrically, as described, and serving to close the openings or open them to either part width or full width at will.

3. The combination of the feed and air chamber F, troughs $f$, and adjustable and reversible gauze shutter E, as and for the purpose set forth.

4. A hive and hive-table provided with interposed feet or supports, by which the hive-bottom is sustained at an elevation above the table when desired, and with openings to receive said feet or supports when the hive-bottom is to rest directly on the table.

5. The honey-boards of pasteboard or paper, constructed and applied, in combination with the honey-boxes I J K, as herein described, for the purpose specified.

JAMES T. FIFE.

Witnesses:
W. B. ANDERSON,
O. J. KING.